L. P. STRONG.
STEAM TRAP.
APPLICATION FILED AUG. 29, 1908.
998,723.
Patented July 25, 1911.
2 SHEETS—SHEET 1.
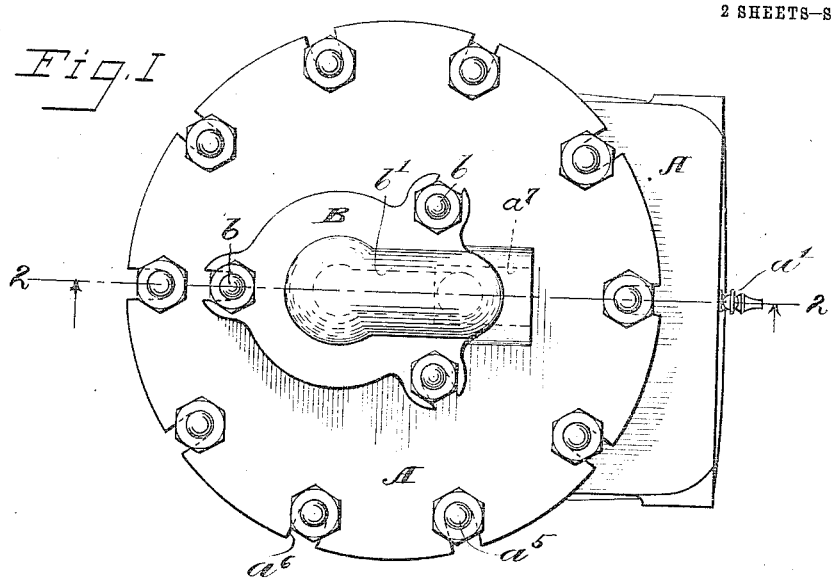
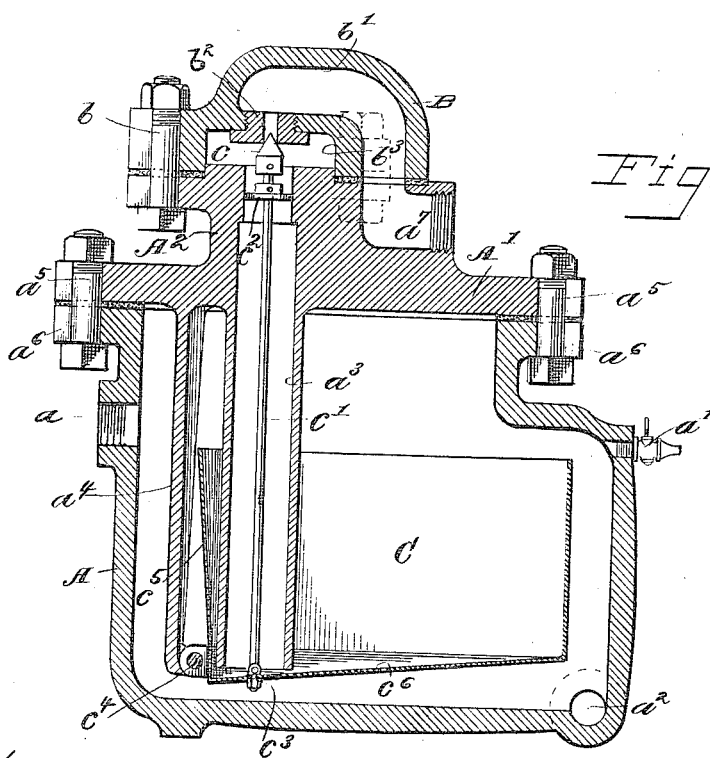
Witnesses:
J. C. Turner
Jno. F. Oberlin
Inventor:
Leslie P. Strong
by J. B. Fay
Attorney.

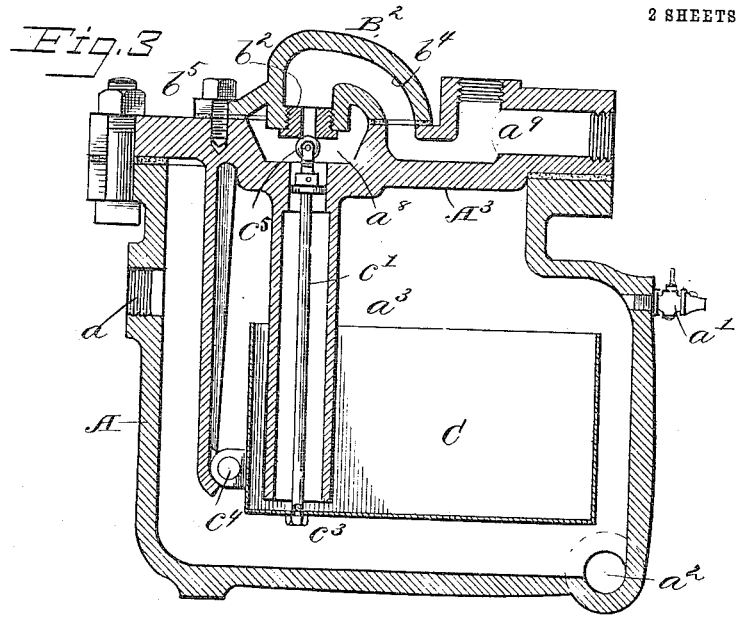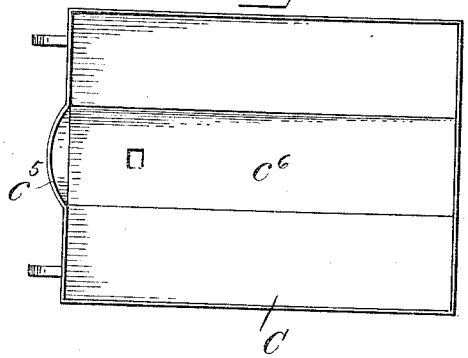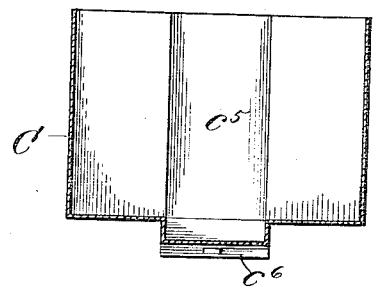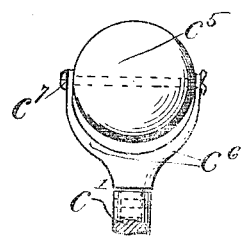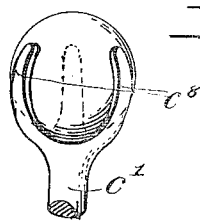

UNITED STATES PATENT OFFICE.

LESLIE P. STRONG, OF CLEVELAND, OHIO, ASSIGNOR TO THE CLARK MANUFACTURING COMPANY, OF CLEVELAND, OHIO, A CORPORATION OF OHIO.

STEAM-TRAP.

998,723.  Specification of Letters Patent.  Patented July 25, 1911.

Application filed August 29, 1908. Serial No. 450,802.

*To all whom it may concern:*

Be it known that I, LESLIE P. STRONG, a citizen of the United States, resident of Cleveland, county of Cuyahoga, and State of Ohio, have invented a new and useful Improvement in Steam-Traps, of which the following is a specification, the principle of the invention being herein explained and the best mode in which I have contemplated applying that principle, so as to distinguish it from other inventions.

The present invention relates, as indicated, to steam traps, the term being used in its general signification as designating apparatus for removing water of condensation from steam pipes, separators, heaters, engine cylinders and the like without at the same time permitting the steam to be wasted.

The object of the invention is the provision of a device of the class referred to that will render more easily accessible, than in prevailing types of construction, those working parts most susceptible to wear, viz., the valve and valve seat controlling the discharge of the trap.

The invention has the further object of providing a bucket of novel design whereby the capacity of the trap is measurably increased without correspondingly enlarging its dimensions.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but several of the various mechanical forms in which the principle of the invention may be used.

In said annexed drawings: Figure 1 is a plan view of a trap embodying my several improvements in preferred form; Fig. 2 is a central vertical section of such trap taken on the line 2—2, Fig. 1; Fig. 3 is a similar section showing a slightly modified form of construction; Figs. 4 and 5 are respectively a plan view and a transverse section of the bucket forming one of the features of said trap; and Figs. 6 and 7 show in detail two forms of valve construction.

My trap, as will be observed by reference to the drawings just described, is of the intermittent discharge type comprising a casing A that, together with a cover A′, provides a closed receptacle into which the water of condensation, or other like liquid is admitted through an inlet opening $a$. Said casing A is further provided with a vent controlled by a suitable valve $a'$ and with a drain opening $a^2$ as is usual in structures of this class. The cover A′ is removably secured by means of bolts $a^5$ to a slotted flange $a^6$ wherewith the upper edge of the casing is provided, so that access, in case of necessity, may be had into the interior of the casing. It will be understood, however, that occasion for this in the type of apparatus in hand seldom occurs. Such cover A′ is provided with a tubular extension $a^3$, that is preferably cast integrally therewith and projects into the interior of the receptacle as shown; also with a passage $a^7$ designed to constitute an outlet for the receptacle, but unconnected with such extension. In the construction illustrated in Figs. 1 and 2 this outlet passage is formed in a laterally flanged head $A^2$ that rises above the cover A′ in order to facilitate the securing to said cover of a cap B, which latter is formed with a passage $b'$ adapted to connect the outlet opening $a^7$ in the cover with the bore of the tubular extension $a^3$. Said cap B is secured in place by means of bolts $b$ in the same fashion as the cover is secured to the casing and has the portion of its face contiguous to said extension recessed as at $b^3$. A valve seat $b^2$ is removably mounted in the end of the cap passage that opens into such recess, being conveniently threaded therein so that it may be unscrewed by a wrench or the like. Coöperative with said valve seat is a valve $c$ detachably secured to the upper end of a valve stem $c'$ of the usual construction, that is reciprocably held in the tubular extension $a^3$ of the cover A′. Operation of this valve stem and the valve $c$ borne thereby is secured by means of a bucket C pivotally attached at one end near its bottom to a plate that depends from such cover in front of the inlet opening $a$, so as to serve the double purpose of a support for the bucket and a deflecting plate for the water as it enters the trap. The end of the tubular extension constituting the discharge pipe of the trap is located in such pivotally supported end of the bucket, the end wall of the latter being flared outwardly as at $c^5$ to permit the pipe end to lie close to the junction of the end wall and bottom of the bucket. I further form a longitudinal section $c^6$, Figs. 4 and 5, of the bucket's bottom, so as to slope downwardly toward such pivoted end in the raised position of the bucket at an angle such that, when the bucket is tilted, such inclined portion is substantially horizontal. The lower end of the valve stem $c'$ is pivoted to the bucket at $c^3$ in the usual fashion.

The foregoing construction of bucket, it will be seen, permits the location of the discharge pipe end very close to one lower edge of the bucket without interfering with the freedom of movement of the latter, and at the same time causes the bucket to drain practically dry. As a result not only is the capacity of the bucket, namely the amount of liquid discharged per operation, increased, but the buoyancy of the bucket is increased likewise and its actuation of the valve rendered that much more positive.

In the modified form of construction illustrated in Fig. 3, the prevailing form of bucket is shown by way of diversity, it being to the construction of the cap or supplementary cover $B^2$ that I would chiefly call attention. The main cover $A^3$, it will be observed is not here provided with a flanged head, the cap instead being secured directly upon the upper face of the cover, which latter is recessed at $a^8$ to provide room for the valve seat $b^2$, and coöperating valve $c$. The arrangement of the outlet passage $a^9$ in the cover and of the connecting passage $b^4$ in the cap it will be observed is substantially the same as in the preferred construction. The former, however, is branched in order that connection may be directly had with either a vertical or horizontal pipe. The cap in this case is secured in place by means of set-bolts $b^5$ threaded into suitable apertures in the cover plate.

The general operation of the trap does not, it is believed require detailed explanation, it being sufficiently obvious from the foregoing description. Attention is hence merely called by way of conclusion to the advantages secured by the novel form of cap construction herein adopted. It is the valve and valve seat, of course, that most frequently require attention in apparatus of the class in hand. To gain access to them, it is merely necessary in the present improved type of trap to remove the cap or supplemental cover whereupon the valve is presented, extending as it does, well above the cover proper, and likewise the coöperative valve seat in the under face of the cap is disclosed in conveniently accessible position. From such cap, the valve seat may furthermore be readily removed if it requires to be reground or replaced. Similarly, the valve may be detached with equal ease from the upper end of the valve stem.

All this, it will be observed is obtained without the necessity of disturbing either the inlet or outlet connections of the trap, or for, that matter, the main gasket, viz., the joint between the casing and cover.

In addition to the modification in the construction of the cap, or supplementary head, of the trap as shown in Fig. 3, a new form of valve for controlling the trap discharge is also there illustrated. Referring to Fig. 6, for more detailed illustration, such valve will be seen to consist in a ball $c^5$ rotatably secured to the arms of a fork $c^6$ pivotally mounted upon the upper end of the stem $c'$, by means of a pin $c^7$. This pin is preferably disposed parallel with the axis of the bucket, so that as the latter rises and falls to alternately seat and unseat the valve, more or less of a rotative effect is exerted upon the latter, thereby causing it each time to present a new surface to the seat and preventing undue wear at any one place. The superiority of a ball valve over other types of valve, as for example the needle shaped, or conical, valve shown in Fig. 2, in closely fitting to the seat, so as to do away with wire drawing is well recognized and has led to its use even where rotative movement is not to be had. It is very difficult to secure such an accurate fitting of parts in a trap of the type in hand that the valve will be seated squarely and this, as should be obvious, will result in the case of a needle valve in leaving a small opening on one side or the other through which the water will leak even when the discharge is supposed to be closed.

By using three or more branches $c^8$ at the upper end of the stem, as shown in Fig. 7, I am not only enabled to dispense with the pin $c^7$ but to secure a still greater capacity for rotation of the ball valve with a corresponding reduction in wear of its surface.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of a receptacle; a cover therefor provided with a tubular extension into the interior of said receptacle and with a passage constituting an outlet for said receptacle but not directly connected with such extension; a cap detachably secured to said cover and formed with a passage adapted to connect such duct and extension, said cap having the portion of its face contiguous to such extension recessed; a valve seat removably mounted in the end of the cap's passage that opens into such recess, said valve seat being alined with said extension; a valve stem reciprocably held in such tubular extension with its upper end projecting into the recess in said cap; and a valve removably secured to such upper end of said stem, said valve being coöperative with said valve seat, but otherwise independent of such cap, whereby, upon removing said cap, said seat is exposed and said valve left standing outside said cover, all without breaking the exterior connections of such receptacle.

2. In a device of the character described, the combination of a receptacle; a cover therefor provided with a tubular extension into the interior of said receptacle and with a laterally flanged head formed with a passage constituting an outlet for said receptacle, but not directly connected with said extension; a flanged cap fitted to said cover and formed with a passage adapted to connect such duct and extension, said cap having the portion of its face contiguous to said extension recessed; bolts passing through the flanges of said head and cap to secure the latter in place; a valve seat removably mounted in the end of the cap's passage that opens into such recess, said valve seat being alined with such extension; a valve stem reciprocably held in such tubular extension with its upper end projecting into the recess in said cap; and a valve removably secured to such upper end of said stem, said valve being coöperative with said valve seat, but otherwise independent of such cap, whereby, upon removing the latter, said seat is exposed and said valve left standing outside said cover, all without breaking the exterior connections of said receptacle.

3. In a device of the character described, the combination with a discharge pipe, and a valve controlling the same; of a bucket pivotally supported at one end near its bottom, and connected to operate said valve, said discharge pipe extending into such pivotally supported end of said bucket and the corresponding end wall being flared outwardly to permit the pipe end to lie close to the corner of the bucket, a longitudinal section of the bottom of the latter being inclined with respect to the walls of the bucket so as to slope downwardly toward such flaring end in the raised position of the bucket, the angle of inclination of such bottom section being such that when the bucket is tilted such section is substantially horizontal.

Signed by me, this 24th day of August, 1908.

LESLIE P. STRONG.

Attested by—
CHRISTINE E. ARNS,
JNO. F. OBERLIN.